Dec. 1, 1931.  J. B. BLEWETT  1,834,119

MOLDING MACHINE AND METHOD OF OPERATING THE SAME

Filed Aug. 16, 1928  7 Sheets-Sheet 1

INVENTOR

Dec. 1, 1931.  J. B. BLEWETT  1,834,119

MOLDING MACHINE AND METHOD OF OPERATING THE SAME

Filed Aug. 16, 1928  7 Sheets-Sheet 4

INVENTOR
John B. Blewett
By Byrnes, Stebbins & Parmelee
His Attys

Dec. 1, 1931.   J. B. BLEWETT   1,834,119
MOLDING MACHINE AND METHOD OF OPERATING THE SAME
Filed Aug. 16, 1928   7 Sheets-Sheet 5
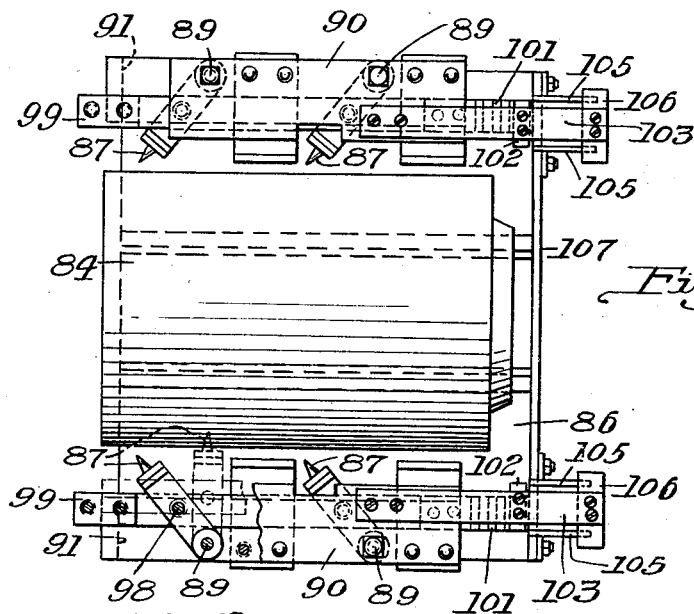
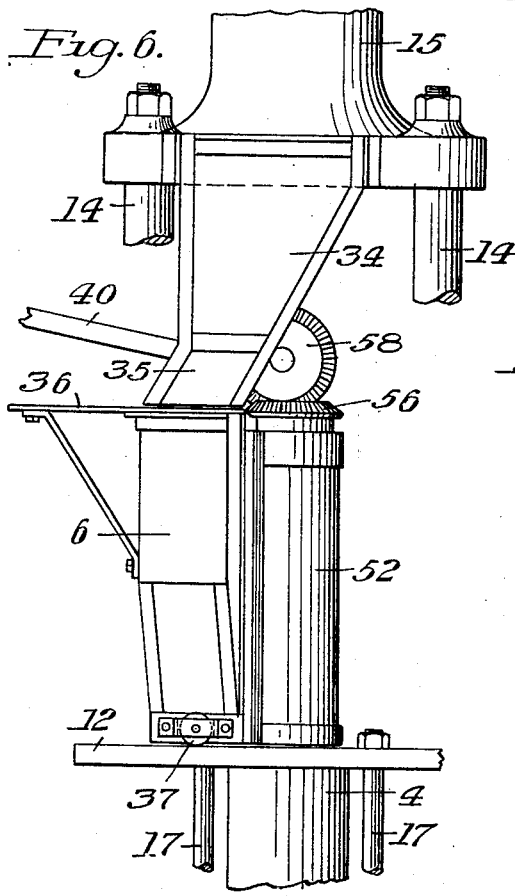
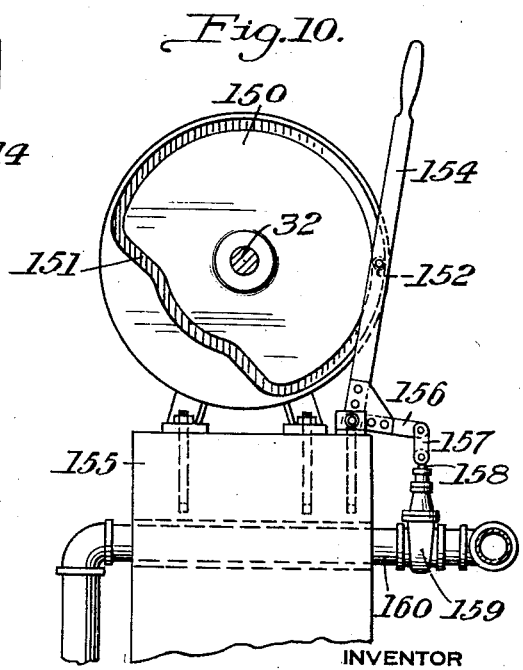
INVENTOR

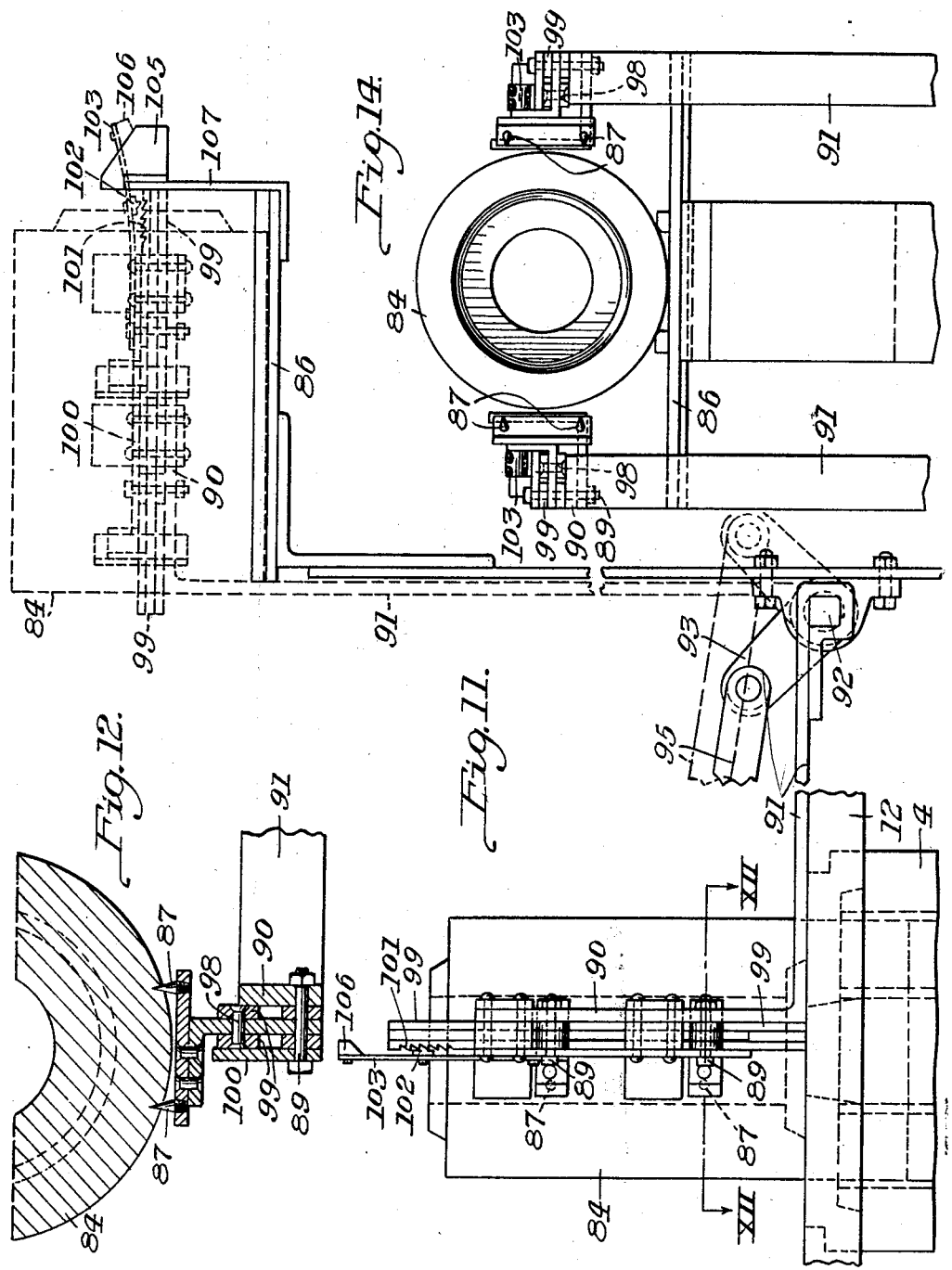

Patented Dec. 1, 1931

1,834,119

UNITED STATES PATENT OFFICE

JOHN B. BLEWETT, OF WELLSVILLE, OHIO, ASSIGNOR TO McLAIN FIRE BRICK COMPANY, OF PITTSBURGH, PENNSYLVANIA, A CORPORATION OF DELAWARE

MOLDING MACHINE AND METHOD OF OPERATING THE SAME

Application filed August 16, 1928. Serial No. 299,931.

My invention relates to molding machines and a method of operating the same, and particularly to molding machines for automatically forming hollow articles.

In molding hollow or cored articles, considerable difficulty has been experienced in securing uniform density and quantity of material in the mold previous to the application of molding pressure. When a measured quantity of material is supplied to a mold, and the material does not uniformly settle throughout the mold, the size of the finished article may vary, or, if the size of the article remains uniform, the density of the material varies. This condition arises primarily from the "honeycombing" or bridging of the material between the sides of the mold and the cores when the material is fed to the mold. The material is usually supplied to the top of the mold and, when the influence of the force of gravity alone is relied upon to distribute the material, "honeycombing" or bridging is prevalent by reason of the failure of the material to completely fill all the narrow spaces in the mold.

I provide means for supplying a measured quantity of molding material to a mold and mechanically distributing and compacting the material in the mold as it is fed thereto. By mechanically distributing the material within the mold, the tendency of the material to bridge over narrow spaces is substantially eliminated with the result that the material in the mold is of substantially uniform density before the molding pressure is applied thereto. Means are provided for bringing the mechanical distributing means into operation in timed sequence with the application of the molding material and the application of molding pressure.

For supplying the molding material, I provide a measuring device that periodically feeds material into a movable chute. The movable chute is brought into cooperative relation to the mold at the desired point in the cycle of operation of the machine and opened. Simultaneously with the positioning of the chute, a mechanical distributing means, in the form of whirling rods, is lowered into the mold and spun therein for imparting a whirling motion to the material. The whirling motion of the material insures that it is uniformly scattered throughout the mold and fills the narrow spaces between the mold walls and the cores. For maintaining the ends of the distributing rods at substantially the level of the compacted material in the mold, the distributing means is progressively raised in the mold as the material is fed thereto. In order to secure speed in the operation of the machine, the rods are whirled continuously. With my machine it is possible to mold a cored article in eight seconds.

After the distributing means is withdrawn from the mold, pressure is applied to upper and lower rams for compressing and molding the material about the cores. The pressure applied to the rams is varied according to the stage of the molding operation. The upper ram is first brought into engagement with the material at high speed and medium pressure. Thereafter a higher compressing pressure is applied to the ram. After the molding operation is completed, the upper ram is withdrawn and the molded object automatically stripped from the mold and cores. The stripping operation is performed by moving the bottom of the mold upwardly relative to the cores and mold walls.

The stripped molded object is seized by a lifting and conveying device and transferred to a rack. When the molded object is delivered to the rack, the lifting and transferring device is automatically freed therefrom and returns to a position for grasping the succeeding molded article.

The successive operations of the molding machine are controlled by a single shaft on which actuating mechanisms and cams are mounted. Certain of the mechanisms and cams control the movement of the feed chute and the distributing means. Other cams control valves for supplying pressure to the rams in a definite sequence. The lifting and transferring device is also actuated by a mechanism from the shaft.

The accompanying drawings illustrate the present preferred embodiment of the invention in which Figure 1 is a plan view thereof;

Figure 6 is an end view of the material feeding device, feeding chute and the distributing means;

Figure 7 is a face view of a cam for actuating the material chute and distributing means;

Figure 10 is an elevational view of a fluid valve and actuating cam;

Figure 11 is an elevational view of the lifting and transferring device;

Figure 12 is a fragmentary view of the lifting and transferring device illustrating the device for gripping molded articles;

Figure 13 is a plan view of the lifting and transferring device and a molded article as the latter is delivered to a receiving rack; and Figure 14 is an end view of the structure shown in Figure 13.

Figure 1:
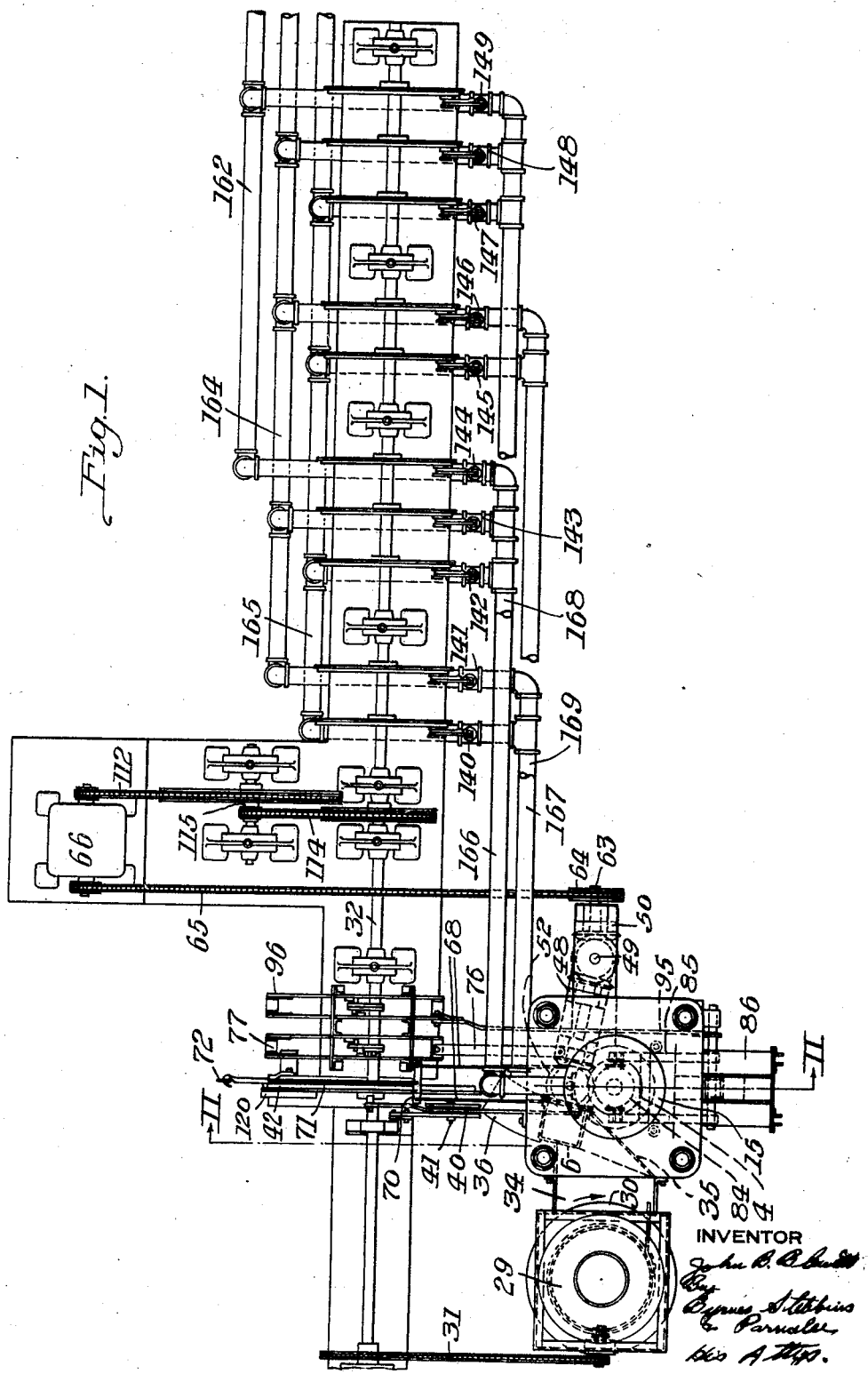
Figure 2:
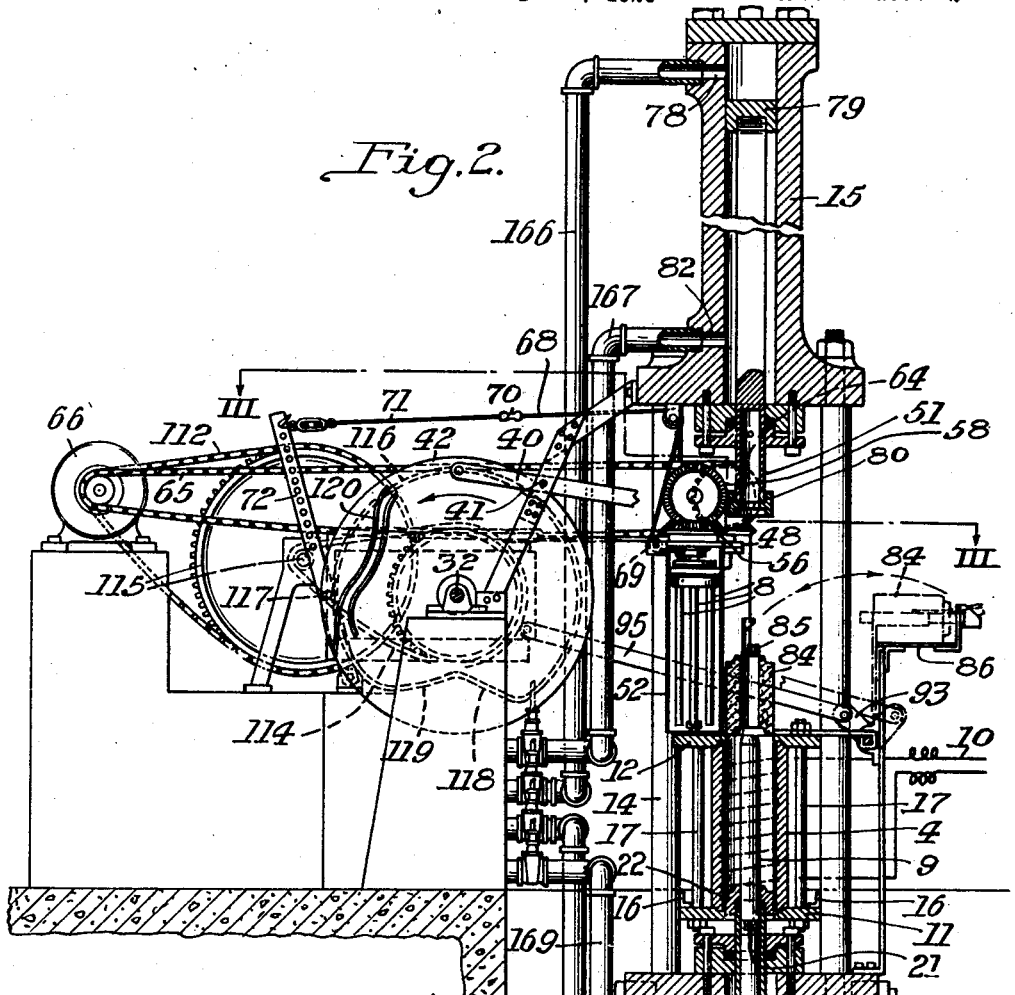
Figure 2 is an elevational view, partially in section of the molding machine.

Referring to Figures 1 and 2, an automatic molding machine comprises a stationary mold 4 mounted on a base 5 for receiving molding material from a movable chute 6. Distributing means 7, in the form of whirling rods 8, are provided for insertion and withdrawal into the mold for imparting a whirling movement to the material as it is fed from the chute 6. The whirling movement imparted to the material insures that it substantially fills all of the spaces between the mold walls and a core 9. The uniform distribution of the material in the mold 4 insures that the sizes and densities of the molded articles shall be uniform. Where the force of gravity alone is relied upon for distributing the material in the mold 4, there is a pronounced tendency for the material to bridge across, or adhere to the adjacent surfaces of the mold 4 and the core 9. Where insufficient material is originally supplied to the mold 4, and the material is packed to uniform density, the sizes of the molded articles vary. Where the size is maintained constant by the movement of one or more rams, the density of the molded articles varies. Non-uniformity in the density of the molded articles results in an undesired porosity thereof. In some instances the degree of porosity is sufficient to cause visible imperfections in the surface of the molded articles.

The mold 4 is here shown as of a cylindrical type, although it is to be understood that the exact configuration of the mold may be changed without departing from the spirit of the invention. A heating coil 10 is embedded in the wall of the mold for providing uniform temperature during the molding operation even when the temperature of the material supplied to the mold varies over a considerable range. The mold 4 is supported between plates 11 and 12 mounted between guide rods 14 projecting upwardly from the base 5. The guide rods 14 also support a cylinder 15. The plates 11 and 12 are provided with brackets 16 for securing them to the guide rods 14, and are connected to each other by clamping bolts 17. The top and bottom of the mold 4 are open.

The stationary core 9 is supported by a rod 18 mounted on a stationary plate 19. The plate 19 constitutes the head for a cylinder 20 through which the rod 18 extends. The rod 18 is provided with a threaded coupling 21 for permitting changes in the core 9 in accordance with the desired shape of the interior of the molded object.

The bottom of the mold 4 is closed by a ram 22 that is movable relatively to the core 9 and through which the latter extends. The ram 22 is provided with an internally threaded seat 24 in which a tubular piston 25 is threaded. The piston 25 terminates in a piston head 26 in the cylinder 20 and through which the rod 18 is movable. The upper surface of the ram 22 is shaped for determining the configuration of one end of the molded article. The cylinder 20 is provided with ports 27 and 28 disposed on opposite sides of the piston head 26 for raising and lowering the latter, respectively. With this construction the ram 22 is raised and lowered relative to the mold 4 and core 9, by the admission of fluid to the ports 27 and 28 respectively.

When the material is being supplied to the mold 4 the ram 22 is in its lowered position. After the molding operation, fluid is admitted through the port 27 through the head end of cylinder 20, and the piston head 26 and rod 25 are moved upwardly, thereby raising the ram 22 and stripping the molded object from the stationary core 9. The length of the cylinder 20 is such that the stroke of the piston 25 is sufficient to raise the bottom of the molded object substantially level with the upper surface of the plate 12.

The molding material is supplied to a cylindrical feed hopper 29 having a revolving bottom disk 30. The disk 30 is driven by a chain 31 connected to a driving shaft 32, more fully hereinafter described. The feed hopper 29 periodically delivers a measured quantity of molding material through stationary chutes 34 and 35 to the movable chute 6. The quantity of the material delivered by the feed hopper 29 to the chute 34 is controlled in accordance with the sizes of the objects being molded. The usual time required for the complete molding of an object by my machine is approximately eight seconds, although it is to be understood that the time required for the completion of each cycle of movements may be varied in accordance with the nature of the articles being molded. The chute 35 is closed by a tail piece 36 carried on the rear of the movable chute 6 when the latter is in its forward or feeding position.

For delivering the molding material to the mold 4 from the chute 6 at the proper time in the sequence of operations of the machine, the chute 6 is provided with a gate 38 movable longitudinally in guideways 39. The gate 38 is actuated by a lever 40. The end of the lever 40 moves on an arc of a circle about a pivotal support 41 in accordance with the movement of a cam 42 mounted on the shaft 32, as hereinafter more fully described. During each revolution of the shaft 32 the other end of the lever 40 is raised and lowered to open and shut the gate 38. To compensate for the circular movement of the chute 6 relative to the fixed end of the lever 40, the latter is connected to the gate 38 by links 44 and 45. The links 44 and 45 are connected by a floating pin 46, and the link 45 is connected to the gate 38 by a pin 47. Accordingly as the chute 6 moves about its center of rotation, the links 44 and 45 assume different angular positions relative to the perpendicular. However, their position is such that the raising or lowering of the lever 40 raises or lowers the gate 38.

Referring to Figures 3, 4, 5 and 6, the movable chute 6 moves in a circular path and is supported by rollers 37 that move over the upper surface of the plate 12. The chute 6 is mounted at the end of a framework 48 mounted for independent turning movement about a vertical axle 49. The axle 49 is mounted in a framework 50 disposed between cylinder 15 and plate 12. The amount of angular movement of the frame 48 about the axle 49 is sufficient to move the chute 6 and the distributing means 7 into cooperative relation with the mold 4 for supplying the latter with material and for swinging them out of the way of a plunger 51 working in the cylinder 15.

The rods 8 of the distributing means 7 are mounted inside a casing 52 integral with the chute 6, that is supported by the frame 48 and the roller 37. The rods 8 are threaded into a collar 54 that is slidable longitudinally upon a squared shaft 55. Continuous rotation is imparted to the shaft 55 and the rods 8 by a bevelled gear 56 supported by ball bearings 57 upon the upper surface of the frame 48. The gear 56 is actuated by a cooperating bevelled gear 58 mounted on a shaft 59 that terminates in another bevelled gear 60. The bevelled gear 60 meshes with a gear 61 rotatably mounted on the frame 48 about the axle 49. Gear 61 meshes with a gear 62 mounted on a shaft 63. Shaft 63 is connected by a sprocket wheel 64 and a chain 65 to a motor 66. The motor 66 is continuously driven and, accordingly, continuous rotating movement is imparted to the stationary sprocket wheel 64 and through the flexible gear train turning about the gear 61 to the rods 8. The rods 8 are raised and lowered in the mold in accordance with the movement of the cam 42, as more fully hereinafter described.

The rods 8 are raised progressively so that their lower ends are substantially on a level with the material in the mold. The whirling action of the rods 8 outside of the core 9 imparts a sufficient whirling action to the material to cause it to completely fill the mold and prevent the occurrence of "honeycombing" or bridging areas in the mold. For raising and lowering the rods, a non-rotating yoke 67 extends into ball-bearings in the collar 54. The yoke 67 is supported by cables 68 which pass over pulleys 69 to a bar 70 to which they are attached. The bar 70 is connected by a cable 71 to the end of a lever 72. The lever 72 is actuated by a cam 42 mounted on shaft 32 for raising and lowering the collar 54 during each operating cycle of the machine.

Accordingly, movement of the frame 48 forwardly or backwardly carriers with it the distributing means 7 and the chute 6, and the raising and lowering of the distributing means 7 is separately controlled, but in timed sequence. Movement of the frame 48 as a whole is controlled by a link 76 that is connected to an actuated mechanism or frame 77, shown in Figure 9 and hereinafter more fully described.

After the mold 4 is filled with material and the distributing means 7 withdrawn therefrom, the ram 51 is depressed by the application of fluid under pressure through a port 78 to the piston 79 supporting it. The piston 79 is first subjected to medium pressure to lower it at high speed, and thereafter it is subjected to higher pressure for completing the molding operation. The face of the ram 51 may be changed in accordance with the desired configuration of the upper end of the molded article. This connection is obtained by providing threads 80 near the bottom of the piston 79. After the molding operation is completed, the piston 79 is raised by supplying fluid under pressure through a port 82 in the cylinder 15.

After the ram 51 is withdrawn, the ram 22 is started upwardly under high pressure in the cylinder 20 for stripping the molded article 84 from the core 9. Thereafter the pressure is reduced and the molded article raised to substantially the level of the plate 12, where it is received by the lifting and transferring mechanism 85.

Referring particularly to Figures 8 and 11 to 14, inclusive, the lifting and transferring mechanism 85 moves into position to engage the molded article 84 during the latter part of the lifting stroke of the ram 22. The lifting and raising device first seizes the molded article 84 by driving prongs into the outer surface thereof, then lifts it in a vertical direction and then turns it to a horizontal direction and deposits it upon a horizontal rack 86. The molded articles 84 are taken from the rack 86 by hand or by any other suitable conveyor, not shown.

For gripping the molded article 84 the lifting device 85 is provided with pivotally mounted prongs 87. The prongs 87 are mounted upon pins 89 carried by a frame 90. Frame 90 is carried on arms 91 projecting outwardly from a squared shaft 92, secured by a clamp 94 to one of the rods 14. Shaft 92, in turn, is connected through an arm 93 and a link 95 to an actuating mechanism 96 shown in Figure 8, and hereinafter more fully described. Accordingly, as the shaft 32 turns, the link 95 is reciprocated by the mechanism 96 for swinging the frame 90 through approximately 90° about the shaft 92. Each prong 87 is provided with one stationary pivotal support and one movable pivotal support. The prongs 87 are connected by pins 98 to bars 99 slidable longitudinally in the frame 90, thereby constituting a movable pivotal support. The bars 99 are secured between the outer edges of the frame 90 and plates 100 that are secured by the pins or bolts 89. As the bars 99 are moved longitudinally of the frame 90, the prongs 87 are turned about their fixed pivotal supports 89 with the result that they are projected outwardly into engagement with the molded article 84. To accomplish the turning movement, the bars 99 are made longer than the frame 90 and normally project outwardly from both ends of the frame.

When the frame 90 is lowered, the lower end of the bars 99 engage the upper surface of the plate 12 and they are moved longitudinally of the frame for driving the prongs 87 into the molded article 84. For holding the prongs 87 in engagement with the molded article 84, they are provided with teeth 101 at their upper end. The teeth 101 cooperate with a latch 102 carried by a spring 103. Upon the engagement of the lower ends of the bars 99 with the plate 12, they are driven upwardly relative to the frame 90, and the teeth 101 slide over the latch 102. The bars 99 are thereby locked in their raised position with the prongs 87 in engagement with the molded article 84.

The frame 90 is then rotated about the shaft 92 until the article 84 is shoved onto the shelf 86. Shelf 86 is provided with a block 105 over which a block 106 on the outer end of each spring 103 rides. Upon engagement between the blocks 105 and 106, the springs 103 are raised to free the teeth 101 from the latches 102. At the same time, the bars 99 engage uprights 107 on the end of the shelf 86 and withdraw the prongs 87 from engagement with the article 84. Thereafter, the molded article 84 is lifted out of the frame 90 and transported elsewhere. The lifting and transferring device 84 is ready for a subsequent lowering movement to engage the next block ejected from the mold 4.

After the molded articles 84 are seized by the lifting device 85, the ram 22 is lowered by the application of fluid under pressure to the piston head 26 through the port 28.

For controlling the successive operation of the component parts of the machine, I provide the single longitudinally extending shaft 32 that is driven from motor by chains 112 and 114 and a reducing gearing 115. Along the shaft I provide a plurality of cams for controlling the application of fluid under pressure to, and the release of fluid from the cylinders 15 and 20. The cam 42 is provided for controlling the gate 38 and the movement of the distributing means 7. The mechanisms 77 and 96 for controlling the movement of the frame 48 and the transfer mechanism 85 are also actuated by the shaft 32. By having the single shaft 32 actuate substantially all of the controlling mechanisms for the component parts of the machine, I am able to secure substantially perfect coordination of movement between the different parts.

Where separate drives are employed for performing different movements difficulty is usually experienced in securing perfect coordination of movement between the parts. If the driving mechanisms are mechanically interlocked, the lost motion and moments of inertia of the mechanical parts are frequently such as to cause faulty coordination of movement. Where the parts are electrically interlocked, the failure or delay of one or more of the electrical parts likewise produces non-uniformity of movement. By having all the actuating mechanism controlled by one shaft, I eliminate such faulty operation.

Referring to Figure 7, the actuating cam 42 for the gate 38 and distributing means 7 is provided on one of its faces with a ledge 116 upon which a roller 117, mounted on the lever 72, bears. The ledge 116 is provided with a sharply inturned portion 118 and a gradually sloping outwardly extending portion 119 for successively permitting the lever 72 to quickly lower the collar 54 and rods 8 into the mold 4 and to slowly retrieve them in accordance with the movement of the shaft 32. The cam 42 is provided with a groove 120 for cooperating with a pin 122 carried at the end of lever 40 for controlling the gate 38. Since the cam 42 controls both the raising and lowering of the distributing means 7 and the opening and shutting of the gate 38, it follows that the movements of the two are coordinated.

Figure 3:
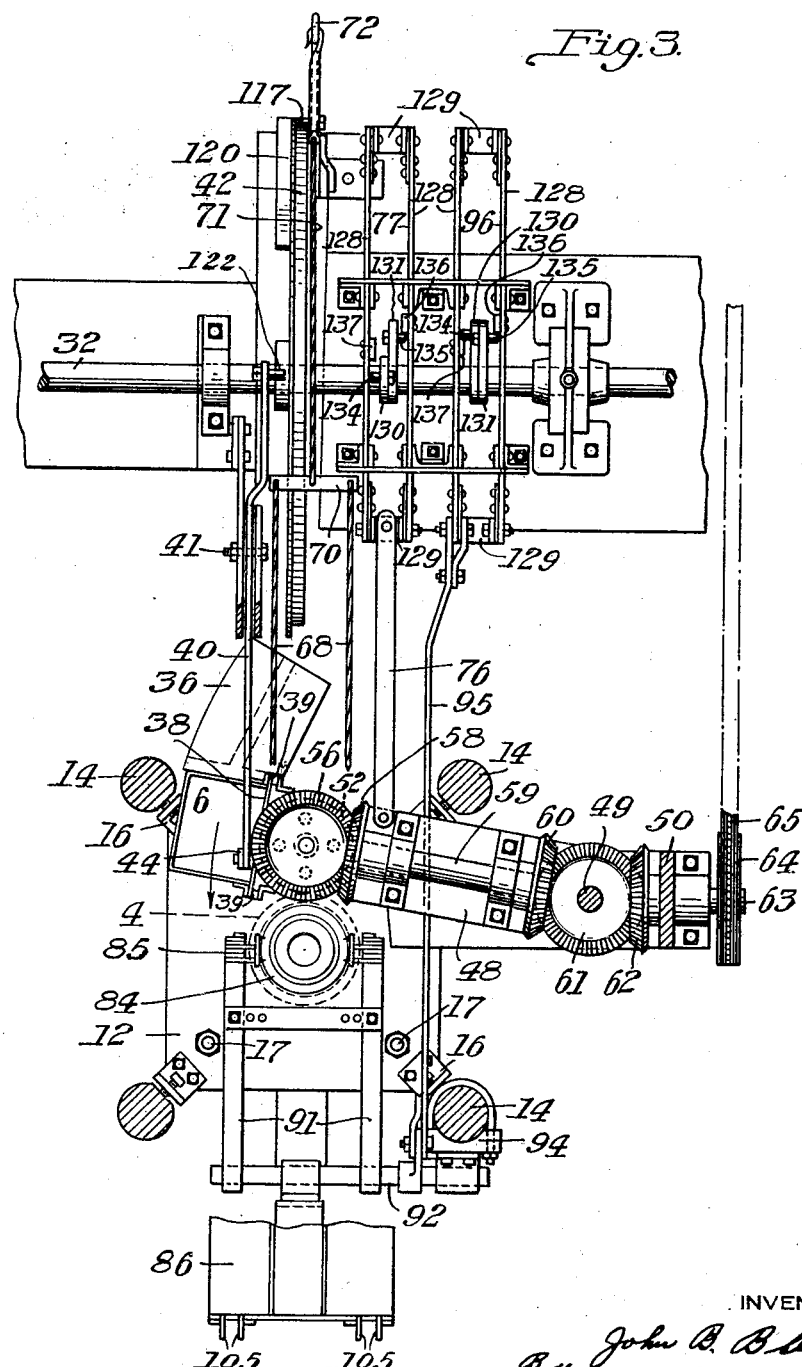
Figure 3 is a fragmentary plan view thereof taken substantially on the section line III—III of Figure 2.
Figure 4:
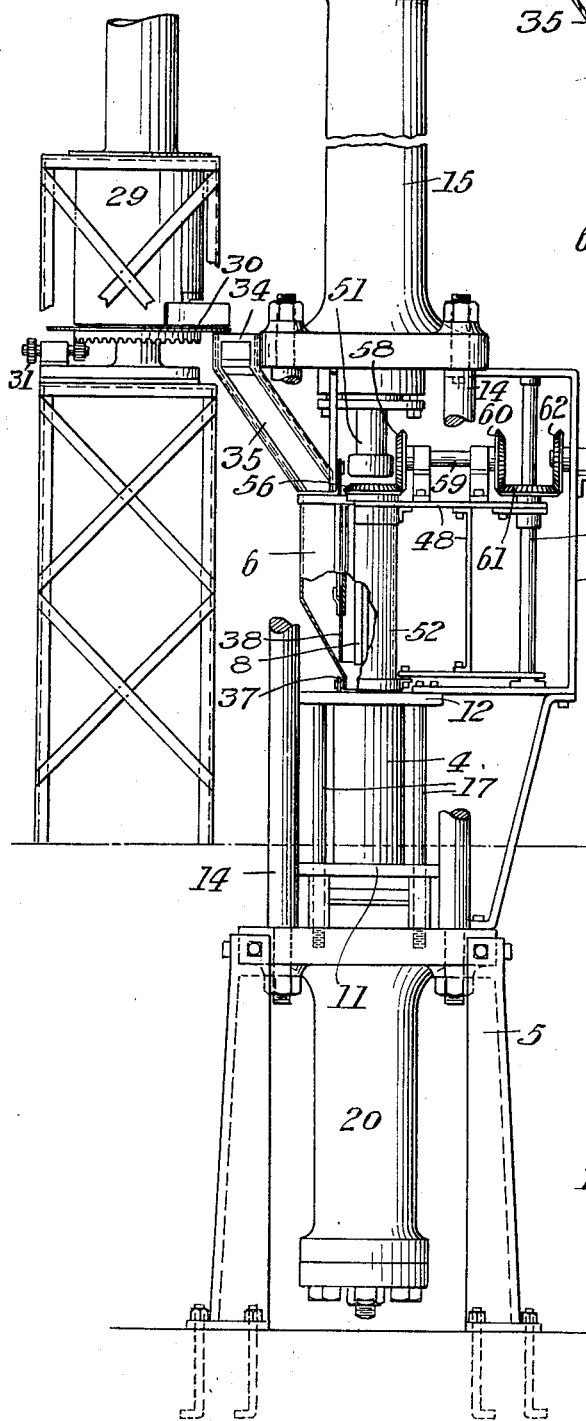
Figure 4 is a fragmentary elevational view of the mold and ram illustrating the material feeding mechanism.
Figure 5:
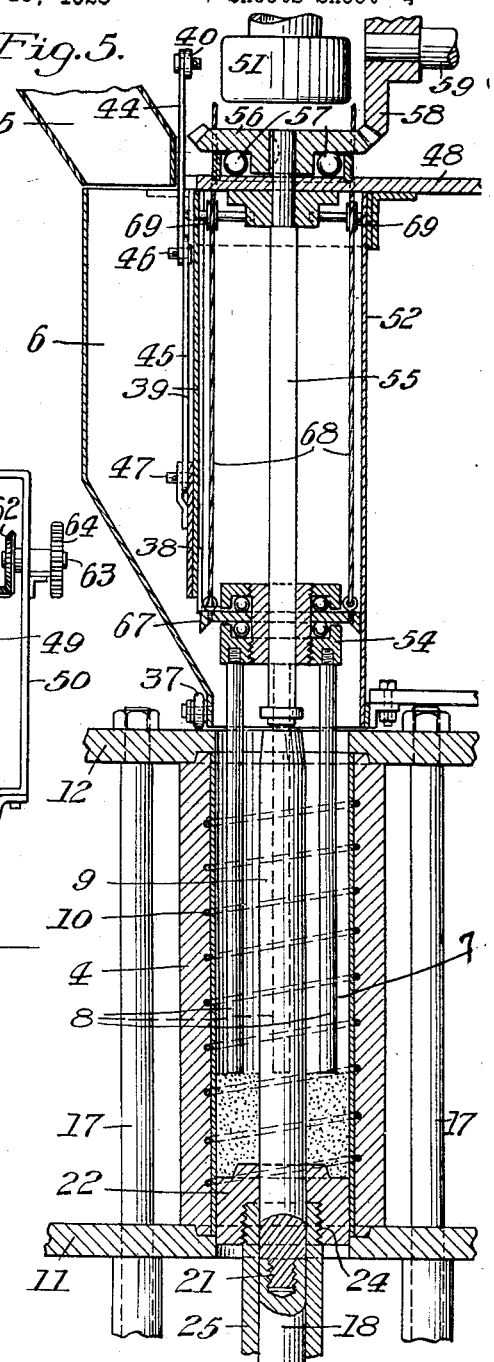
Figure 5 is a longitudinal sectional view illustrating the material chute and distributing means in material-feeding position.
Figure 9:
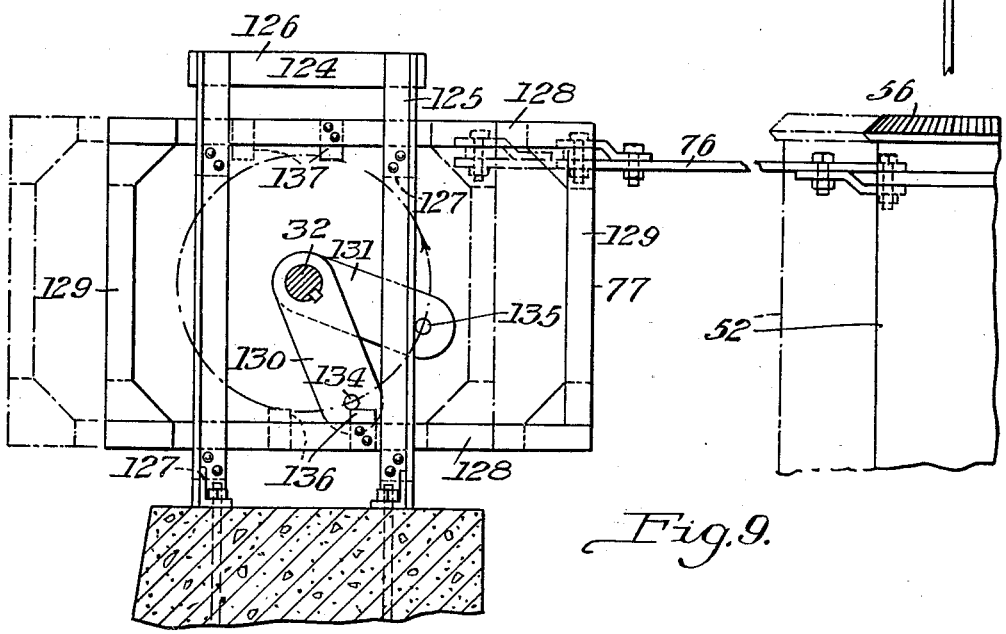
Figure 9 is a similar view of the actuating mechanism for turning the material chute and distributing means.

The actuating mechanism 77 for swinging the frame 48 is shown in Figures 1, 3 and 9. A framework 124 surrounds the shaft 32 and comprises uprights 125 and cross-pieces 126. The frame 124 is common to both of the mechanisms 77 and 96. The uprights 125 support angle irons 127 upon which the actuating mechanism 77 slides.

The actuating mechanism 77 comprises a pair of longitudinally extending frames 128 that are connected by crosspieces 129. Arms 130 and 131 are mounted on the shaft 32 and are provided with pins 134 and 135 that engage lugs 136 and 137, respectively, as the shaft 32 rotates in a counter-clockwise direction.

The pin 134 engages the lug 136 for advancing the mechanism 77 to swing the frame 48 over the mold 4. After a predetermined rotation of the shaft 32, the pin 135 engages the lug 137 and retracts the frame 48 from its position over the mold 4.

Figure 8:
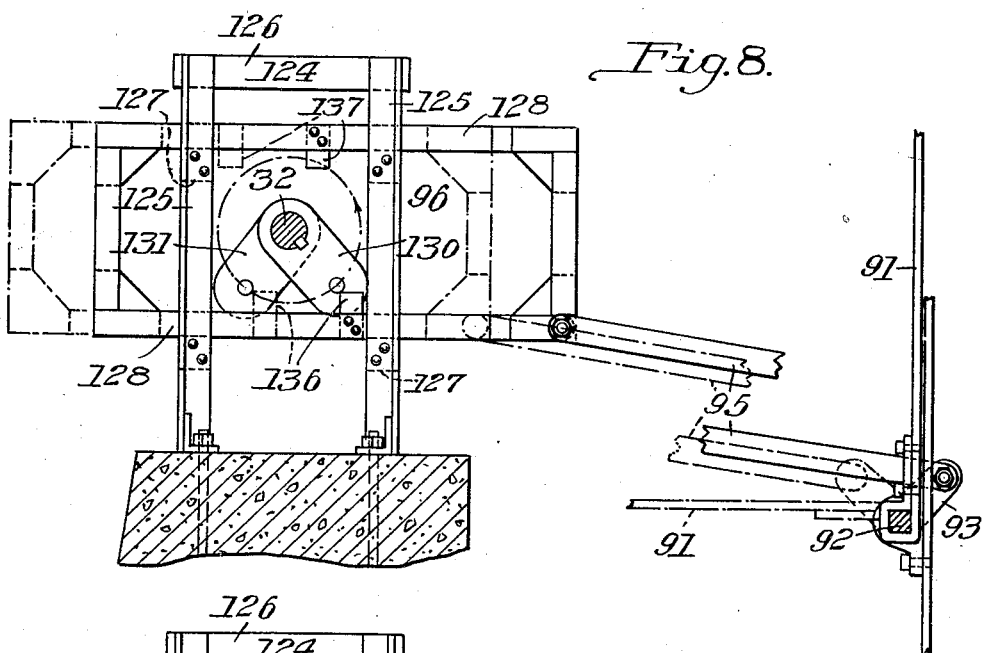
Figure 8 is an elevational view of the actuating mechanism for the transfer and lifting device.

Referring to Figure 8, the construction and operation of the actuating mechanism 96 for the lifting and transferring mechanism 85 is substantially similar to that of the mechanism 77, except for difference in the size and spacing of the lugs, pins and arms in accordance with the timed relation of the movement of the mechanism 96 to the sequence of operation of the other parts of the machine.

Referring to Figures 1, 2 and 10, the actuation of the cylinders 15 and 20 is controlled by a plurality of cam-actuated valves 140, 141, 142, 143, 144, 145, 146, 147, 148 and 149, one of which is shown in detail in Figure 10. Each valve comprises a cam 150 having a groove 151 in which a roller 152 carried by a lever 154 operates. Each lever 154 is mounted on a base 155 and is provided with an arm 156. The arm 156 is connected by a link 157 with a stem 158 of a valve 159. Each valve 159 is inserted in a pipe line 160. Accordingly, as the cam 150 is rotated with the shaft 32, the valve 159 is automatically opened and closed in accordance with the shape of the groove 151.

Valves 144 and 149 are connected to a source 162 of high fluid pressure. Valves 148, 146, 143 and 141 are connected to a source 164 of medium fluid pressure, while valves 147, 145, 142 and 140 are connected to an exhaust pipe 165. The port 78 in the cylinder 15 is connected by a pipe 166 to the valves 147, 148 and 149. The port 82 is connected by a pipe 167 to the valves 145 and 146. The valves 142, 143 and 144 are connected by a pipe 168 to the port 27 in the cylinder 20. The port 28 is connected by a pipe 169 to the valves 140 and 141.

Assuming a molded article 84 to be at the top of the plate 12 and to have been seized by the lifting and transferring mechanism 85, the plunger 22 is moved downwardly by the opening of valve 141 for admitting medium pressure fluid to the top of the cylinder head 26. Simultaneously, the valve 140 is opened to permit the exhaust of fluid from the bottom of the cylinder 20. As the ram 22 is lowered, the chute 6 and the distributing means 7 are moved over the mold by the actuating mechanism 77. As soon as the ram 21 completes its downward movement, the valves 140 and 141 are closed. The whirling rods 8 are then lowered into the mold 4 by the cam 42, while the gate 38 is raised by the same cam. This operation allows the mold to be filled with molding material. The lifting and transferring device 85 remains in its vertical position during the mold filling operation. The cam 42, operating through lever 72, raises the rods 8 as the material is fed into the mold, so that the lower ends of the rods are substantially at the level of the compacted material in the mold 4. At the conclusion of the filling operation, the gate 38 is closed by the cam 42. The frame 48, carrying with it the chute 6 and distributing means 7 is then withdrawn from over the mold 4 by the actuating device 77. This completes the movement of the different parts of the press preparatory to the pressing operation.

To initiate the pressing operation, the valve 148 is opened for supplying medium pressure fluid to the upper face of the piston 79 to start the ram 51 downwardly at high speed. Valve 147 is opened to permit the escape of fluid from beneath the piston head through the port 82. Thereafter the valve 148 is closed and the valve 149 opened to supply fluid under high pressure to the upper surface of the piston 79, and the ram 51 completes its downward stroke at slow speed under high pressure. During the latter part of the movement of the ram 51, the molded article 84 is compacted and shaped by the ends of the rams 22 and 51. To raise the ram 51, the valves 146 and 147 are opened to supply fluid under medium pressure to the lower surfaces of the piston 79 and to permit the release of the fluid above the piston, respectively. This moves the ram 51 upwardly simultaneously with the upward movement of the ram 22. After the ram 51 completes its upward stroke, the valves 146 and 147 are closed.

To move the ram 22, valve 140 is next opened to permit the escape of fluid from the upper part of the cylinder 20 and the valve 144 is opened to permit fluid under high pressure to start the ram 22 upwardly. The upward movement of ram 22 strips the molded article from the core 9. The valve 144 is then closed and the valve 143 opened to permit the remainder of the lifting movement of the ram 22 to be under less pressure and at a higher speed.

At the same time, the lifting and transferring device 85 starts downwardly from its horizontal position toward its vertical position for seizing the molded object 84. Meanwhile, the ram 22 raises the molded article 84 to substantially the upper surface of the plate 12 and the valve 143 is closed. The lifting device 85 completes its downward stroke and removes the molded article from the plate 12, as heretofore described.

The downward movement of the ram 22 is accomplished by opening the valve 140 for exhausting fluid from beneath the piston head 26 and the opening of valve 141 for supplying fluid under medium pressure to the upper surface of the piston head 26.

The foregoing cycle of operations may be continued indefinitely by replenishing the molding material in the hopper 29 and upon the application of the proper fluid pressures in the pipes 162 and 164.

While I have illustrated and described the preferred form of my invention, it is to be understood that it may be otherwise embodied within the spirit of the invention and the scope of the following claims.

I claim:

1. In a molding machine, a mold, a stationary core means for supplying material to the mold, and means insertable into the space between the mold and the core for distributing the material in the mold as it is supplied thereto.

2. In a molding machine, a mold, a fixed core, means for supplying material to the mold, and means insertable into and withdrawable from the space between the mold and the core for distributing the material as it is supplied to the mold.

3. In a molding machine, a mold, a fixed core, means for supplying material to the mold, and automatically operable distributing means movable into and out of the space between the core and mold.

4. In a molding machine, a mold, means for supplying material to the mold, and means insertable into the mold for distributing the material as it is supplied thereto, said distributing means comprising a rotating rod.

5. In a molding machine, a mold, a fixed core, means for supplying material to the mold, means for distributing the material in the space between the core and the mold, and mechanical means for inserting and withdrawing the distributing means into and from the mold.

6. In a molding machine, a mold, means for supplying material to the mold, means for distributing the material in the mold, means for inserting the distributing means into the mold and for withdrawing it from the mold, and means for compressing the material in the mold after the distributing means is withdrawn.

7. In a molding machine, a mold, means for periodically supplying material to the mold, means cooperating with the material supplying means for distributing the material in the mold, means for compressing the material in the mold, and means for removing the molded object from the mold.

8. In a molding machine, a mold, means for periodically supplying a predetermined amount of material to the mold, means cooperating with the material supplying means for distributing the material in the mold, means for compressing the material in the mold, and means for removing the molded object from the mold.

9. In a molding machine, a mold, means for supplying material thereto, means for compressing the material in the mold, and low-pressure and high-pressure means for actuating the compressing means to exert different pressures upon the material in the mold at different stages in the molding operation.

10. In a molding machine, a mold, means for periodically supplying material to the mold, pivotally mounted means insertable into the mold for distributing the material therein, means for actuating the distributing means, means for removing the molded object from the mold, and means for controlling the movement of the aforesaid means in a definite sequence.

11. In a molding machine, a mold, means for periodically supplying material to the mold, pivotally mounted means insertable into the mold for distributing the material therein, means for actuating the distributing means, and means for automatically controlling the movement of the aforesaid means.

12. In a molding machine, a mold, means for periodically supplying material to the mold, movable, mechanically driven means insertable into the mold for distibuting the material therein, means for actuating the distributing means, and means for automatically controlling the movement of the aforesaid means.

13. In a molding machine, a mold, continuously driven means insertable into and withdrawable from the mold for distributing the material therein, and means for actuating the distributing means comprising a flexible gear train.

14. In a molding machine, a mold, a fixed core, means for supplying material thereto, and means for distributing the material in the space between the core and mold comprising a rotatable member and means for raising and lowering the rotatable member.

15. In a molding machine, a mold, a fixed core, means for supplying material thereto, means for distributing the material in the space between the core and mold comprising a continuously driven rotating member, and means for inserting the rotating member into and withdrawing it from the mold without interfering with its continuous rotation.

16. In a molding machine, a mold, continuously actuated means for distributing material therein, means for lowering the distributing means into the mold and withdrawing it therefrom, and means to compress the material in the mold.

17. In a molding machine, a mold, means for supplying material to the mold, means for distributing the material within the mold, a core within the mold and a plunger cooperating with the core for compressing the material within the mold.

18. In a molding machine, a mold, means for supplying material to the mold, means for distributing the material within the mold, a core within the mold, a plunger cooperating with the core for compressing the material within the mold, and means for causing the plunger to exert different pressures upon the material in the mold during different stages of the compressing operation.

19. In a molding machine, a mold, means for supplying material to the mold, means insertable into and withdrawable from the mold for distributing material therein, means for compressing the material in the mold, means for ejecting the molded material from the mold at the completion of the compressing operation, and means for automatically controlling the operation of the aforesaid means.

20. In a molding machine, a mold, means for periodically supplying material to the mold, means insertable into and withdrawable from the mold for distributing material therein, means for compressing the material in the mold, means for ejecting the molded material from the mold at the completion of the compressing operation, and means for automatically controlling the operation of the aforesaid means.

21. In the art of molding compressible materials, the steps consisting in supplying material to a mold and progressively agitating the material near its top surface as the mold is being filled.

22. In the art of molding compressible materials, the steps consisting in supplying material to a mold, progressively agitating the material adjacent to its top surface as the mold is being filled to secure uniformity of the mass, and thereafter compressing the material.

23. In the art of molding compressible materials, the steps consisting in supplying material to a mold, progressively agitating the material adjacent to its top surface as the mold is being filled to secure uniformity of the mass, compressing the material, and thereafter ejecting the molded article.

24. In the art of molding compressible materials, the steps consisting in supplying material to a mold, progressively agitating the material adjacent to its top surface as the mold is being filled to secure uniformity of the mass, compressing the material, and thereafter ejecting the molded article, all of said steps being performed in timed sequence.

25. In the art of molding compressible materials the steps consisting in supplying material to a mold, progressively agitating the material adjacent to its top surface as the mold is being filled to secure uniformity of the mass, compressing the material, and thereafter ejecting the molded article, all of said steps being performed automatically in timed sequence.

26. In the art of molding compressible materials, the steps consisting in supplying material to a mold, progressively agitating the material adjacent to its top surface as the mold is being filled to secure uniformity of the mass, compressing the material, and thereafter ejecting the molded article, all of said steps being performed in timed sequence, and automatically repeating the operations.

27. In a molding machine, a vertically disposed mold, a ram for closing the lower end of the mold and stripping the molded article therefrom, a pressure ram for closing the other end of the mold, and low-pressure and high-pressure means for the pressure ram.

28. In a molding machine, a vertically disposed mold, a ram for closing the lower end of the mold and stripping the molded article therefrom, a pressure ram for closing the other end of the mold, and means for supplying fluid under different pressures to both rams.

29. In a molding machine, a feed hopper, a mold, means for conveying molding material from the hopper to the mold, means for distributing the material in the mold, means for compressing the material in the mold, means for ejecting the molded article from the mold, and means for seizing the molded article and transferring it from the mold.

30. In a molding machine, a mold, means insertable into the mold for distributing material therein, and means for moving the distributing means into and out of alinement with the mold.

31. In a molding machine, the combination with means for supplying a definite amount of molding material to a mold, of means for periodically relatively positioning the mold and supply means for transferring the material to the mold, and means for automatically actuating the supply and moving means.

32. In a molding machine, a mold, means for supplying material thereto, means for compressing material therein, means for ejecting a molded article and a control mechanism for the machine comprising a single shaft, and valves connected to the compressing and ejecting means and actuated by the shaft.

33. In a molding machine, a mold, a plurality of rams for compressing material therein, fluid actuated means for moving the rams and means for controlling the fluid actuating means comprising a shaft and a plurality of cam-controlled valves actuated thereby.

34. In a molding machine, a mold, material-supplying and distributing means shiftable into and out of alinement therewith, compression means thereabove, ejecting means therebelow, and removing means at one side, and means for actuating said means in a predetermined sequence.

35. In a molding machine, a mold, material-supplying means and distributing means normally positioned laterally of the mold, and means for shifting said means into operative relation to said mold.

36. In a molding machine, a mold, a piveted distributor, driving means therefor including a pivoted connection, means for periodically shifting the distributor laterally of the mold and means for moving it axially of the latter.

37. In a molding machine, a mold, a ram for compressing a molded article in said mold, and a distributor having a pivotal mounting whereby it operates on the contents of the mold and is then withdrawn to avoid interference with said ram.

38. In a molding machine, a mold, a swinging feeder and distributor, and a reciprocable plunger, means for swinging said feeder and distributor into and out of operative relation with the mold, means for moving the distributor axially of the mold and means for reciprocating the plunger, whereby to charge the mold, distribute the charge, and permit compression thereof by said plunger.

39. A transfer device including a table, means for positioning the article to be transferred substantially on a level therewith, a rotatable frame, teeth pivoted therein, and actuating means for forcing the teeth into the article upon engagement with said table, locking means for the teeth, a receiving rack, and means thereon for releasing said locking means as the article is deposited on the rack.

40. An article transfer device including a rotatable frame, grippers thereon and means effective when the frame is in article-engaging position for actuating the grippers, means for rotating said frame, a receiving rack, and means on said rack effective when the frame is in article-discharging position, for releasing said grippers.

41. A transfer device comprising means for seizing an article, means actuated when the seizing means is in article-engaging position for rendering the seizing means effective, receiving means and means thereon for releasing said second-mentioned means when the seizing means is in article-discharging position.

42. In a transfer device for a molded article, an ejector for removing the article from a mold and placing it in position to be transferred, a rotatable gripping device including automatic actuating and releasing means effective at the ends of its stroke, and means for rotating said device.

43. A transfer device including a shiftable gripper, means for shifting the gripper, and means effective at one portion of the gripper path for causing it to seize an article, and means effective at another portion of the path for causing the gripper to release an article.

In testimony whereof I have hereunto set my hand.

JOHN B. BLEWETT.